United States Patent [19]

Limbaugh

[11] 4,170,962

[45] Oct. 16, 1979

[54] DOG OR ANIMAL RETAINER DEVICE

[76] Inventor: Donald W. Limbaugh, 640 Ottawa Ave., Defiance, Ohio 43512

[21] Appl. No.: 837,375

[22] Filed: Sep. 28, 1977

[51] Int. Cl.² ............................................. A01K 1/064
[52] U.S. Cl. ....................................... 119/109; 54/34; 24/230 TC
[58] Field of Search ........................... 119/109; 54/34; 24/230 TC

[56] References Cited

U.S. PATENT DOCUMENTS

| 788,136 | 4/1905 | Heilrath | 54/34 |
| 889,707 | 6/1908 | Mett | 54/34 |
| 3,884,190 | 5/1975 | Gurrey | 119/109 |

*Primary Examiner*—Hugh R. Chamblee

[57] ABSTRACT

A tethering device, for being incorporated into a leash used for holding a dog or other animal, the tethering device including a convolute or spiral loop at each end of the leash, and which is quickly and easily attachable to a securing ring, by simply rotating the convolute upon the ring.

1 Claim, 8 Drawing Figures

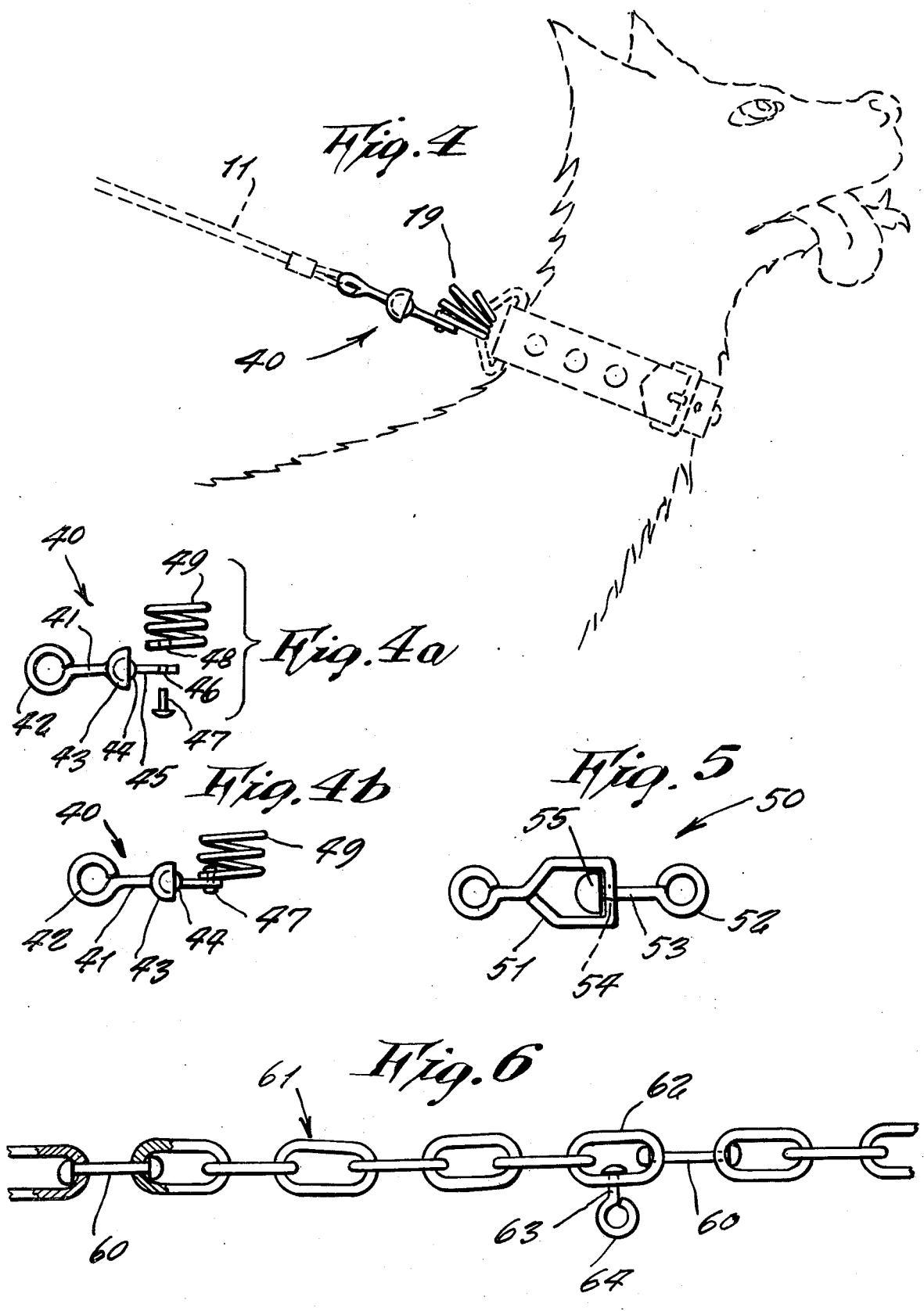

DOG OR ANIMAL RETAINER DEVICE

This invention relates generally to tethering leashes, for use on dogs or other animals.

A principal object of the present invention is to provide a dog or animal retainer device, which can be quickly and easily attached, without the necessity of employing any snap hooks or spring loaded rings.

Another object of the present invention is to provide a dog or animal retainer device, in which a spiral loop, at each end of a leash, is attachable to a securing ring, by simply rotating the spiral loop, so that it threads on the ring, and which provides an attachment which is nearly impossible for an animal to break loose, regardless of what movements or gyrations the animal makes.

Another object is to provide a dog or animal retainer device, which can be made in various sizes or shapes, and wherein the number of parts in the manufacture thereof are a same or less, than in a conventional animal retaining snap.

Other objects are to provide a dog or animal retainer device, which is simple in design, inexpensive to manufacture, rugged in construction, easy to use and efficient in operation.

These, and other objects, will be readily evident, upon a study of the following specification, and the accompanying drawing, wherein:

FIG. 4 is a side view, illustrating how a pull on a leash is exerted against all of the turns or spirals of the convolute;

FIG. 4a is a side view showing the parts of the retainer device of FIG. 4 in a disassembled condition prior to final assembly;

FIG. 4b is a side view thereof illustrated assembled, and showing the convolute spirals in a relaxed position;

FIG. 5 illustrates a swivel of different design than the ball and socket swivel shown in the foregoing Figures, and which may be used in the present invention; and FIG. 6 is a detail of a leash which swivels at intervals along the length.

Figure 1:
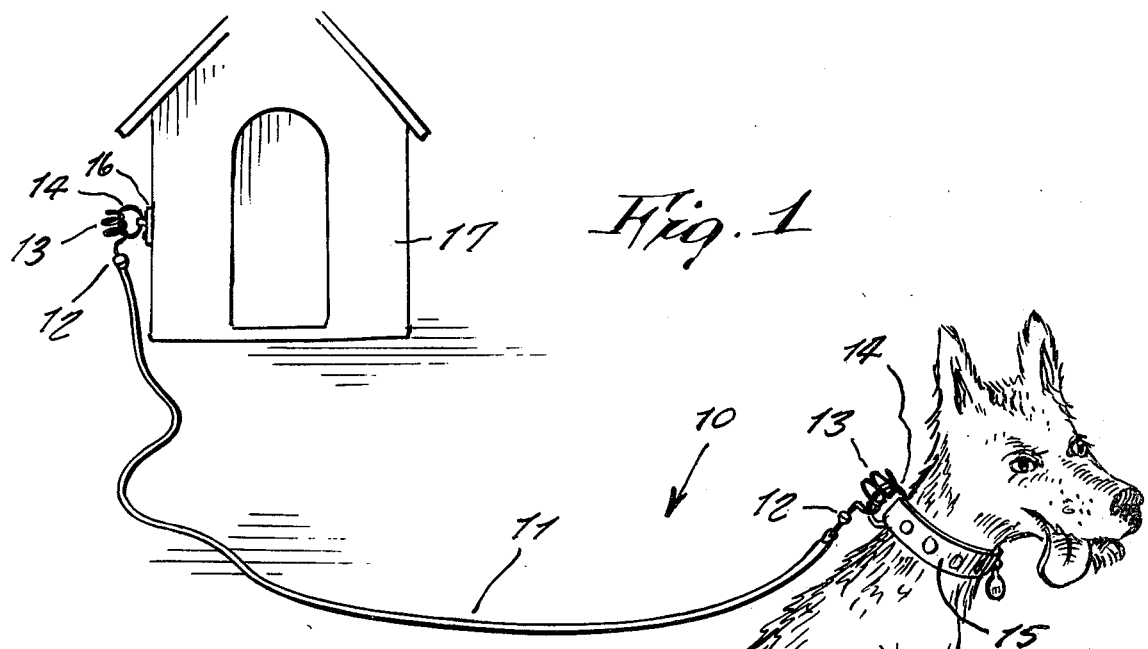
FIG. 1 is a perspective view of the present invention, shown in operative use, retaining a dog.

Referring now to the drawing in greater detail, and more particularly, to FIG. 1 thereof at this time, the reference numeral 10 represents a dog or animal retainer device, wherein there is a leash 11, which, at each end, is connected, by means of a swivel 12, to a convolute or spiral loop 13, which can be quickly and securely locked to a securing ring 14, when a person so wishes, but which cannot be accidentally detached by the animal itself.

Such ring 14 may comprise a ring that is normally provided upon a dog collar 15, or it may be a ring fastened on a bracket 16, that is attachable either to a doghouse 17, a post or any other stationary object, in order that a dog 18, or other animal, can thus be prevented from wandering.

Figure 2:
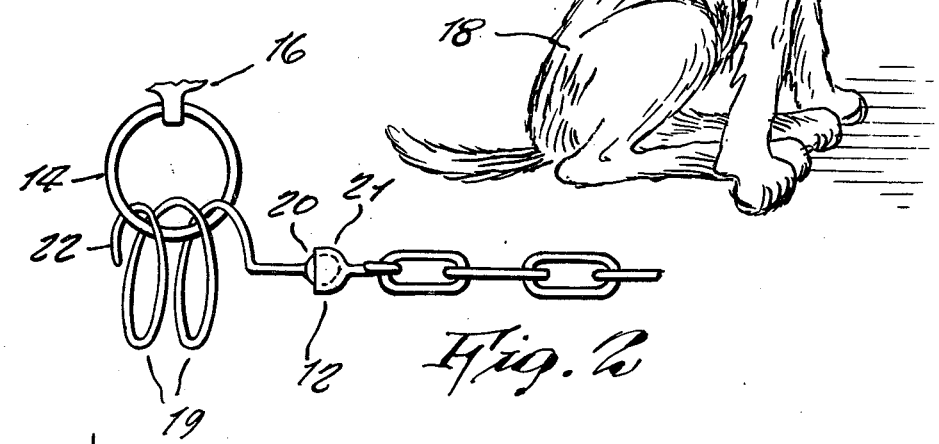
FIG. 2 is an enlarged, detail view of one end of a chain leash, showing the invention.

In the present invention, the spiral loop 13, is preferably made of a strong spring steel, bent up into a number of turns 19, which are spread apart from each other, one end of the spiral loop being integral with a ball 20, that comprises a component of a ball and socket joint 21, as shown in greater detail in FIG. 2. The opposite end 22, of the spiral loop, is adaptable for being threaded upon the ring 14, by simply axially rotating the spiral loop, so that it feeds upon the ring. Thus, attachment can be quick and easy, while at a same time, it forms a very secure connection, so that the animal cannot detach the same.

The leash 11 may comprise a nylon rope, a leather thong, or it may comprise a chain, as shown in FIG. 2.

The turns 19 of the spiral loop may be either circular, or else they may be oval shape, or any other shape, as preferred by a manufacturer. The number of turns may be more or less, as preferred by the manufacturer, and the sizes of the turns 19 may be made all a same size, or of different sizes, in a same convolute 13. Thus, each succeeding turn may be made larger than a preceding one, or it could be unconventionally made with larger turns at one end or at a center, singly, or in groups, as preferred. The turns may be made either further apart or close together, as wished. The design, alternately, may be made involute.

It is to be noted that the provision of the swivel 12, adjacent each end of the leash 11, is made so that a twisting animal cannot unwind the convolute from the retaining ring 14, even when the animal is making circular gyrations or other movements.

Figure 3:
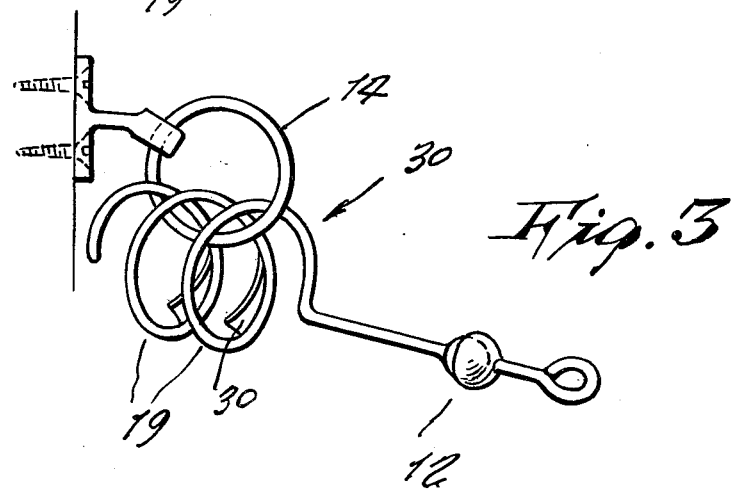
FIG. 3 is a view generally similar to FIG. 2, and showing a modified design thereof, which additionally includes a positive locking feature.

Referring now to FIG. 3 of the drawing, there is shown a modified design of convolute 30, which is a same as the convolute 12, except that, in this design, each turn 19 is additionally provided with a stamped-out spur 31 on an inner side of the turn, so that as the convolute is threaded upon the ring 14, the spurs do not interfere with the rotation of the convolute, as it feeds on the ring. However, the spurs each prevent easy rotation of the convolute in an opposite direction, so that the convolute cannot be accidentally disengaged from the ring, even if the animal is of a kind that can readily twist the convolute itself. Such a convolute might be preferable for animals such as monkeys and the like, who may employ their hands in trying to undo the attachment of the convolute and ring. However, when a person wishes to willfully and intentionally make the disengagement, he can easily accomplish the same with a little practice, by making sure that the spurs do not abut with the ring, as the convolute is rotated.

It is to be noted, that, in the present invention, as indicated in FIG. 4, the retainer device may be made so that a pulling force is exerted against all of the turns or spirals 19 of the convolute. It is also to be noted, that the above described swivel, comprised of ball and socket joint, need not, necessarily, be the type as shown, but can, alternately, consist of other mechanical, freely rotatable elements. The chain, or other leash material to which the convolute is attached, can be formed at various intervals, with swivels, in order to keep the chain or other leash material, from knotting or tangling. The present invention may incorporate any type of swivel that is different from the ball and socket type swivel 12, shown in FIGS. 1 through 4, and is, accordingly, not limited to only one such type.

The design of retainer device 40 shown in FIGS. 4, 4a and 4b includes a metal link 41 which at one end has a loop 42 for attachment to a leash 11 and which at its other end has a socket 43 so as to form a universal ball and socket joint with a ball 44 formed on the end of a swivel arm 45 which at its opposite end has a transverse opening 46 for receiving a pin 47 receivable in a transverse opening 48 near one end of a convolute 49. The retainer device 40 thus differs from the retainer device 10 by including the pin 47 which thus additionally allows a swivelling action between the arm 45 and the convolute 49. In FIG. 5, one example of a swivel 50 is illustrated, as one of any other swivels that may be used. This swivel includes members 51 and 52, that inter-rotate by a prong 53 of one member swiveling in a hole 54 of the other member. An enlarged head 55, on the prong end, prevents disengagement of the parts.

In FIG. 6, a leash 11 shows a plurality of swivels 60, located at spaced intervals along the chain leash 61, so as to keep the leash from knotting or tangling. Additionally some of the links 62 of the chain leash 61 may be individually each provided with independent swivel arms 63, if so wished by a manufacturer, so that other leashes or objects may be attached to a loop 64 thereof.

While various changes may be made in the detailed construction, it is understood that such changes will be within the spirit and scope of the present invention, as is defined by the appended claims.

What I now claim is:

1. A dog or animal retainer device, comprising, in combination, a leash, one end of said leash being adaptable for attachment to a stationary object, while an opposite end of said leash is attachable to an animal that is intended to be tethered in order to not wander away, said leash incorporating means to prevent knotting or tangling, and each opposite end of said leash being provided with a spiral loop; said spiral loop comprising a stiff material, and including a plurality of turns that are spaced apart from each other, one end of said spiral loop being attachable to an end of said leash by means that allow swiveling; said turns of said spiral loop being made in any shape, said spiral loops comprising any number of said turns, and said turns being any desired distances apart; said spiral loop at each end of said leash being attachable to a ring through which it may be threaded; said leash comprising a substantially rope-like member; said swiveling means comprising a swivel wherein one end thereof is freely rotatable respective to an opposite end thereof; a plurality of said swivels being located in spaced-apart relationship along a length of said leash; a pull on said device exerting a force against all of said turns of said spiral loop; said spiral loop including a spur on each turn thereof; and one end of said spiral loop having a transverse opening receiving a pin in a transverse opening at one end of a swivel arm, said swivel arm at its other end being connected by a ball and socket joint to a link having a loop for attachment to said leash.

* * * * *